(12) United States Patent
Kowalewski et al.

(10) Patent No.: US 11,844,307 B2
(45) Date of Patent: Dec. 19, 2023

(54) MOWER DECK AUTOMATIC LEVELING SYSTEM

(71) Applicant: Deere & Company, Moline, IL (US)

(72) Inventors: Kelly J. Kowalewski, Nashotah, WI (US); Kyle T. Ressler, Westbend, WI (US); Meghan M. Krause, Menomonee Falls, WI (US); Benjamin J. Swart, Allenton, WI (US); Jorge Cavazos Garcia, Monterrey (MX); Joel P. Leyh, Waupun, WI (US); Jesse A. Braun, Waukee, IA (US)

(73) Assignee: DEERE & COMPANY, Moline, IL (US)

(*) Notice: Subject to any disclaimer, the term of this patent is extended or adjusted under 35 U.S.C. 154(b) by 359 days.

(21) Appl. No.: 17/301,321

(22) Filed: Mar. 31, 2021

(65) Prior Publication Data
US 2022/0312672 A1  Oct. 6, 2022

(51) Int. Cl.
*A01D 34/74* (2006.01)
*A01D 34/64* (2006.01)
*A01D 101/00* (2006.01)
*A01D 34/00* (2006.01)

(52) U.S. Cl.
CPC ........... *A01D 34/74* (2013.01); *A01D 34/008* (2013.01); *A01D 34/64* (2013.01); *A01D 2101/00* (2013.01)

(58) Field of Classification Search
CPC ...... A01D 34/74; A01D 34/008; A01D 34/64; A01D 2101/00
USPC ........................................................ 56/10.1
See application file for complete search history.

(56) References Cited

U.S. PATENT DOCUMENTS

| 2,972,218 | A | 2/1961 | Benson |
| 3,874,150 | A | 4/1975 | Boeck |
| 4,313,295 | A | 2/1982 | Hansen et al. |
| 4,707,971 | A | 11/1987 | Forpahl et al. |
| 4,715,168 | A | 12/1987 | Oxley |
| 4,869,057 | A | 9/1989 | Siegrist |
| 5,325,650 | A * | 7/1994 | Fuse .................. A01D 43/0631 56/DIG. 15 |
| 6,023,921 | A | 2/2000 | Burns et al. |
| 6,339,918 | B1 | 1/2002 | Thomas |
| 6,510,678 | B2 | 1/2003 | Ferris et al. |
| 6,658,831 | B2 | 12/2003 | Velke et al. |
| 6,698,172 | B2 | 3/2004 | Ferris et al. |
| 6,711,885 | B2 | 3/2004 | Ferris |

(Continued)

FOREIGN PATENT DOCUMENTS

| EP | 1045630 B1 | 9/2002 |
| EP | 1094698 B1 | 10/2002 |
| JP | H07264913 A | 10/1995 |

OTHER PUBLICATIONS

Lawn Tractor Deck Height Sensor 1738724YP parts, pp. 1-2 [online], [retrieved on Jun. 23, 2020]. Retrieved from the Internet <URL: https://www.searspartsdirect.com/product/1wiwhcxbr3-0071-536/id-1738724yp>.

*Primary Examiner* — Mahmoud Gimie

(57) ABSTRACT

A mower deck automatic leveling system includes actuators that adjust the position of the mower deck at a plurality of different locations between the mower deck and vehicle frame at the selected cutting height, and sensors that calibrate the actuators by measuring the distance to a ground surface at a plurality of different locations on a mower deck at the selected cutting height.

11 Claims, 3 Drawing Sheets

(56) References Cited

U.S. PATENT DOCUMENTS

| | | |
|---|---|---|
| 7,146,786 B2 | 12/2006 | Brandon |
| 7,730,705 B2 | 6/2010 | Kubinski |
| 9,003,751 B2 | 4/2015 | Lancaster |
| 9,699,961 B2 | 7/2017 | Ito et al. |
| 9,844,175 B2 | 12/2017 | Dombrowski et al. |
| 9,861,035 B2 | 1/2018 | Kruckeberg et al. |
| 10,485,163 B2 | 11/2019 | Dombrowski et al. |
| 2004/0244348 A1 | 12/2004 | Ferris |
| 2006/0021312 A1* | 2/2006 | Brandon .............. A01D 34/006 56/10.2 R |
| 2007/0180805 A1 | 8/2007 | Melone et al. |
| 2009/0308040 A1* | 12/2009 | Cheek .................... A01D 34/64 56/17.2 |
| 2015/0296711 A1 | 10/2015 | Haun et al. |
| 2016/0316619 A1* | 11/2016 | Johanek ................. A01D 34/74 |
| 2017/0034996 A1* | 2/2017 | Kruckeberg ......... A01D 34/008 |
| 2019/0075724 A1 | 3/2019 | Becke et al. |
| 2020/0084961 A1 | 3/2020 | Dombrowski et al. |
| 2022/0167554 A1* | 6/2022 | Kowalewski .......... A01D 34/86 |

\* cited by examiner

MOWER DECK AUTOMATIC LEVELING SYSTEM

FIELD OF THE INVENTION

This invention relates to mower decks suspended from lawn and garden tractors and other grass mowing machines, and more specifically to a mower deck automatic leveling system.

BACKGROUND OF THE INVENTION

A mower deck may be suspended from a lawn and garden tractor, zero turning radius mower or other vehicle, or "floated" on wheels attached to the mower deck. The mower deck may cover one or more rotary cutting blades. When a mower deck is suspended from a vehicle frame, the mower deck and blades should be in proper positioning relative to the ground surface at all cutting heights. For example, the mower deck should be properly aligned so that each rotary cutting blade is level side-to-side, and has a slight forward angle or "rake." Proper positioning of the mower deck helps achieve better cut quality, prevents grass frazzling, provides better grass dispersal, better bagging results, and reduces the power required to run the engine. Additionally, the mower deck should be calibrated so that the blades are at the cutting height specified by the mower deck height control knob or lever.

In the past, leveling a mower deck has been a manual process which required the operator to get off the seat and use a measuring instrument to check the height of rotary blades or the mower deck itself relative to the ground. Additionally, the operator had to adjust threaded nuts and bolts or other mechanical leveling devices in the deck lift system. There is a need for a mower deck automatic leveling system that can be done from the operator seat.

Efforts to level a mower deck also have involved lowering the mower deck to the ground, then raising both sides of the deck by the same amount to a height of cut position. An electrical lifting mechanism was used to indicate the mower deck reached the ground when current spikes. However, such systems do not level the mower deck after it reaches the height of cut position and may not be accurate.

In the past, some mower deck automatic leveling systems have used sensors to detect and adjust the deck position relative to the frame of the mowing vehicle. For example, U.S. Pat. Nos. 9,844,175 and 10,485,163. These systems also may not accurately detect if the mower deck is level with respect to the ground surface, and the mowing vehicle frame may not always be completely straight and level.

Alternatively, instead of leveling a mower deck, attempts to improve cut quality have included active height control. Active height control may involve moving or flexing a mower deck when a sensor detects ground contour changes such as slopes or bumps. However, active height control actually does not level the mower deck, but responds to ground contour for floating mower decks that are suspended from the mower frame, or helps prevent scalping for ground following mower decks having gage wheels.

There is a need for a mower deck automatic leveling system that may be used from the operator seat. There is a need for a mower deck automatic leveling system that is more accurate than previous systems. There is a need for a mower deck automatic leveling system that levels the mower deck relative to the ground surface and at each height of cut position.

SUMMARY OF THE INVENTION

A mower deck automatic leveling system includes a plurality of sensors mounted to a mower deck at different locations. The sensors measure the distance to the ground surface. A plurality of actuators are connected to a mower deck lift system between the mower deck and a vehicle frame. An electronic controller calibrates each actuator by comparing the actuator position to the sensor position relative to the ground. If the difference exceeds a stored offset value, the system updates the constant with a new or updated offset value.

DESCRIPTION OF THE PREFERRED EMBODIMENT

Figure 1:
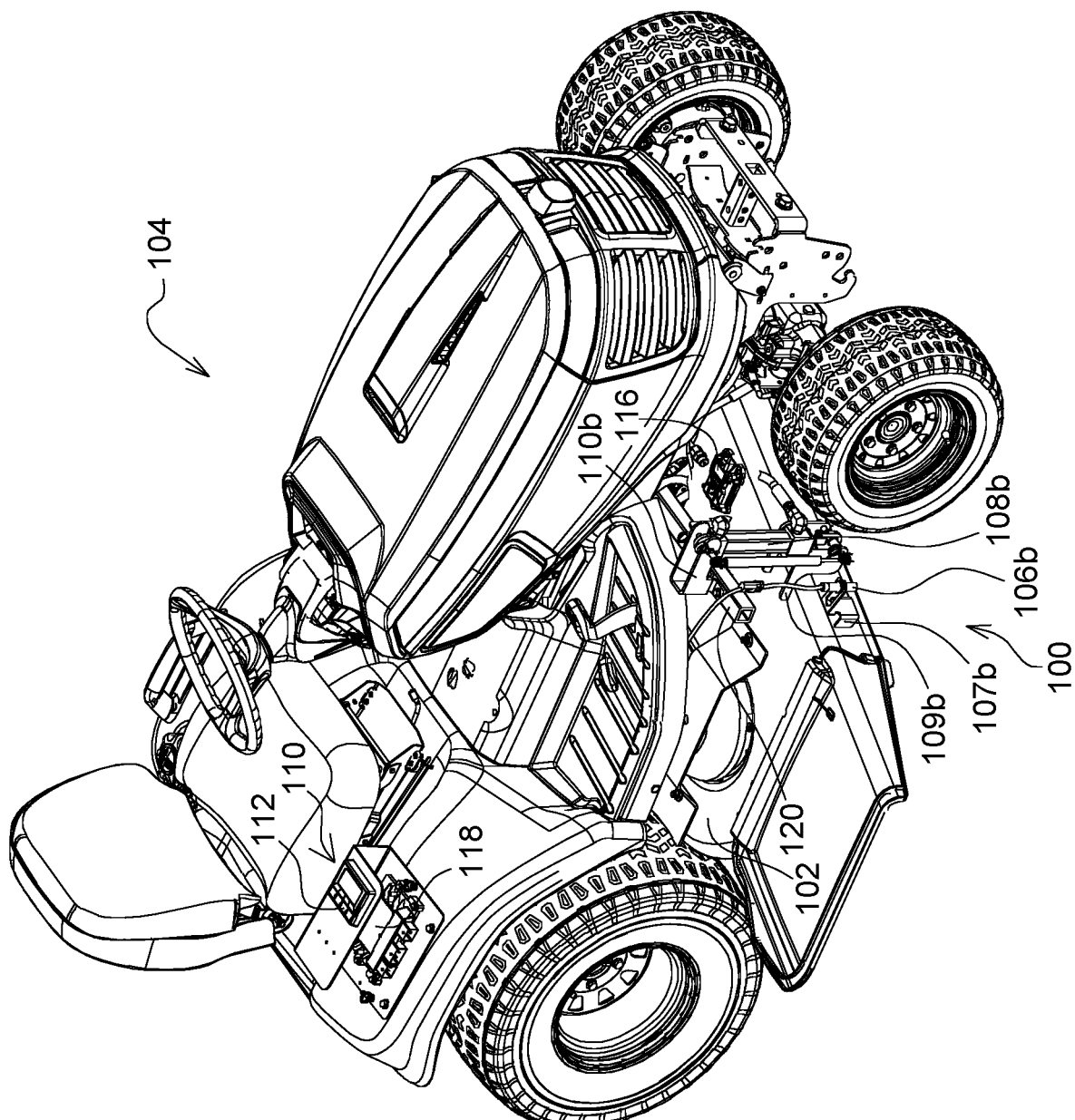
FIG. 1 is a top perspective view of a lawn and garden tractor with a mower deck automatic leveling system according to a first embodiment of the invention.

FIG. 1 shows mower deck 102 on lawn and garden tractor 104 positioned between the vehicle's front and rear wheels. The mower deck may cover a plurality of rotary mower blades, each blade mounted to the lower end of a spindle. Pulleys on the upper ends of the spindles may be rotated by one or more endless belts driven by an internal combustion engine or other power source on the lawn tractor, or the spindles may be rotated by one or more electric motors.

Figure 2:
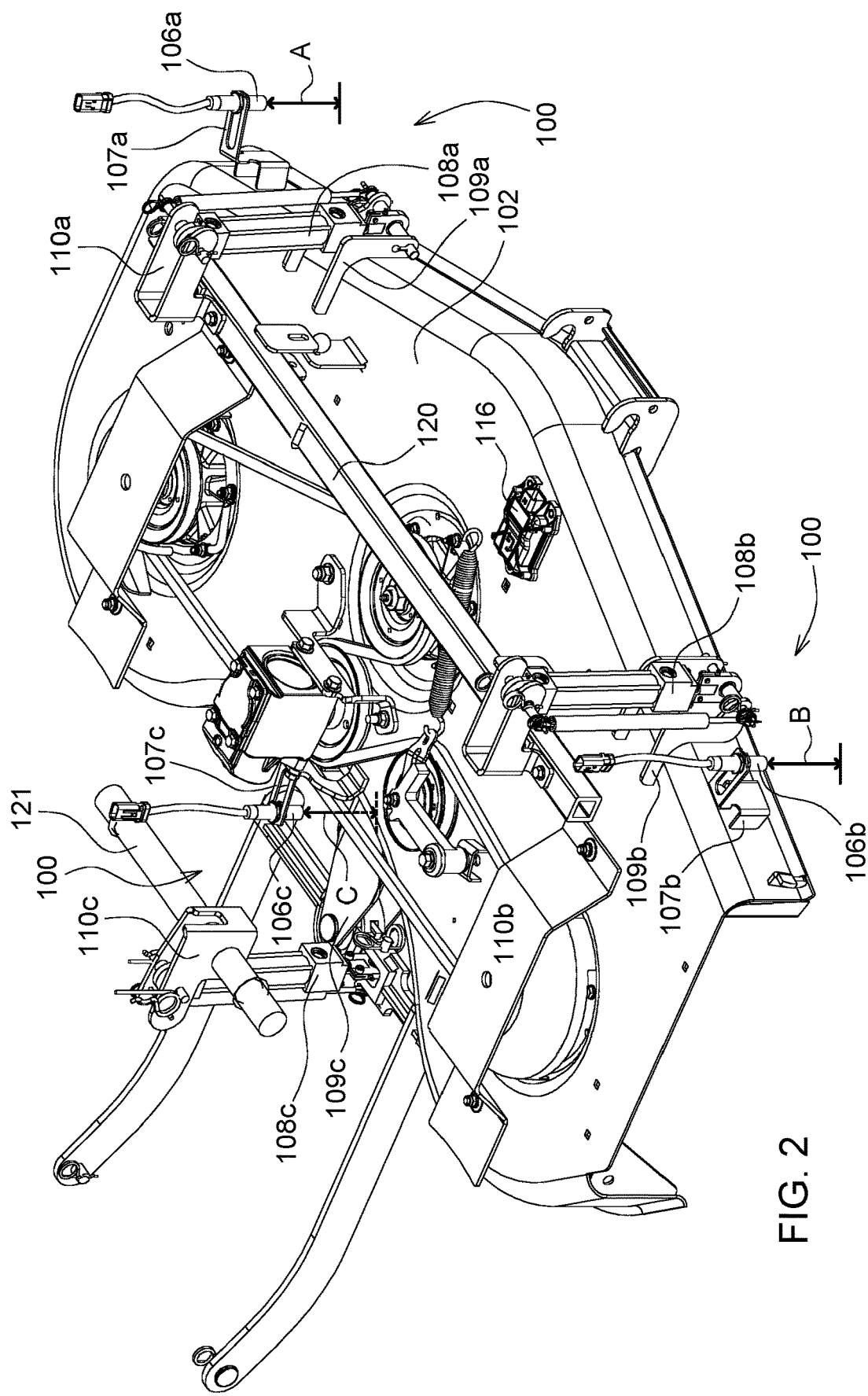
FIG. 2 is a top perspective view of a mower deck with an automatic leveling system according to a first embodiment of the invention

FIG. 2 shows one embodiment of the mower deck automatic leveling system 100 which may include a plurality of ultrasonic sensors 106a, 106b, 106c mounted to the mower deck. Each of the ultrasonic sensors may be mounted with a bracket 107a, 107b, 107c at a different location on the mower deck. Each ultrasonic sensor may measure the distance in millimeters of the ultrasonic sensor to the ground surface. For example, ultrasonic sensor 106a may be mounted to the left front side of the mower deck and measures distance A to the ground surface, ultrasonic sensor 106b may be mounted to the right front side of the mower deck and measures distance B to the ground surface, and ultrasonic sensor 106c may be mounted to the rear center of the mower deck and measures distance C to the ground surface. Alternatively, instead of ultrasonic sensors, the system may include a plurality of time of flight sensors or radar sensors to measure their position relative to the ground surface at several locations on mower deck.

In one embodiment, mower deck automatic leveling system 100 may include a plurality of actuators 108a, 108b, 108c. Each actuator may move the mower deck to the selected height of cut, or may be part of the mower deck lift system that raises and lowers the mower deck to the selected height of cut. After the mower deck lift system moves the mower deck to the selected height of cut, each actuator may be used to make height adjustments to level the mower deck at the height of cut, independently of the other actuators. For example, left front actuator 108a may adjust the height of the left front portion of the mower deck, right front actuator 108b may adjust the height of the right front portion of the mower deck, and rear actuator 108c may adjust the height of the rear center portion of the mower deck. Each actuator may adjust part of the mower deck relative to a frame member of the lawn and garden tractor or vehicle 104. For example, actuator 108a may attach between bracket 109a on the left front of the mower deck and bracket 110a on transverse frame member 120, actuator 108b may attach between bracket 109b on the right front of the mower deck and bracket 110b on transverse frame member 120, and actuator 108c may attach between bracket 109c on the rear of the mower deck and frame member 121. Each actuator may have a position sensor that indicates the actuator position relative to the mower deck lift system or vehicle frame members 120 or 121. Each actuator may be an electric linear actuator or may be a hydraulic cylinder with valves, or a servo motor.

As shown in FIG. 1, in one embodiment, mower deck automatic leveling system 100 may include operator display or control panel 110. The operator display or control panel may be mounted to the vehicle at any location, such as in front of or adjacent the operator seat, or to a portable device such as a cell phone or tablet, and may include controls for the mower deck automatic leveling system from the operator seat. For example, the controls may include an automatic leveling button 112 to activate the mower deck automatic leveling system, and other controls to enter the selected height of cut and/or rake. The mower deck automatic leveling system may command the actuators to positions that level the mower deck at the selected height of cut and/or rake. For example, the system may command the rear actuator to a position higher than the front actuators based on the selected height of cut and rake. Optionally, the operator display or control panel may have touch screen functionality.

In one embodiment, the mower deck automatic leveling system may include one or more motion and/or angle sensors 116. The motion and/or angle sensor may be mounted on the deck or vehicle frame, and may be used to determine the pitch and roll of the mower deck, and movement of the mower deck when using the automatic leveling system. For example, the motion and/or angle sensor may be an inertial measurement unit (IMU). The IMU may include one or more accelerometers and/or gyroscopes, and may have a sampling frequency of 3000 Hertz, for example. The IMU also may be aided by a Global Position Sensor (GPS). Alternatively, instead of an IMU, the motion and/or angle sensor may be an Inertial Navigation System (INS), Aided INS, tilt sensor, inclinometer, or Attitude Heading Reference System (AHRS). Other alternative angle sensors may include a potentiometer or Hall effect sensor mounted between the frame and front axle of the vehicle.

Figure 3:
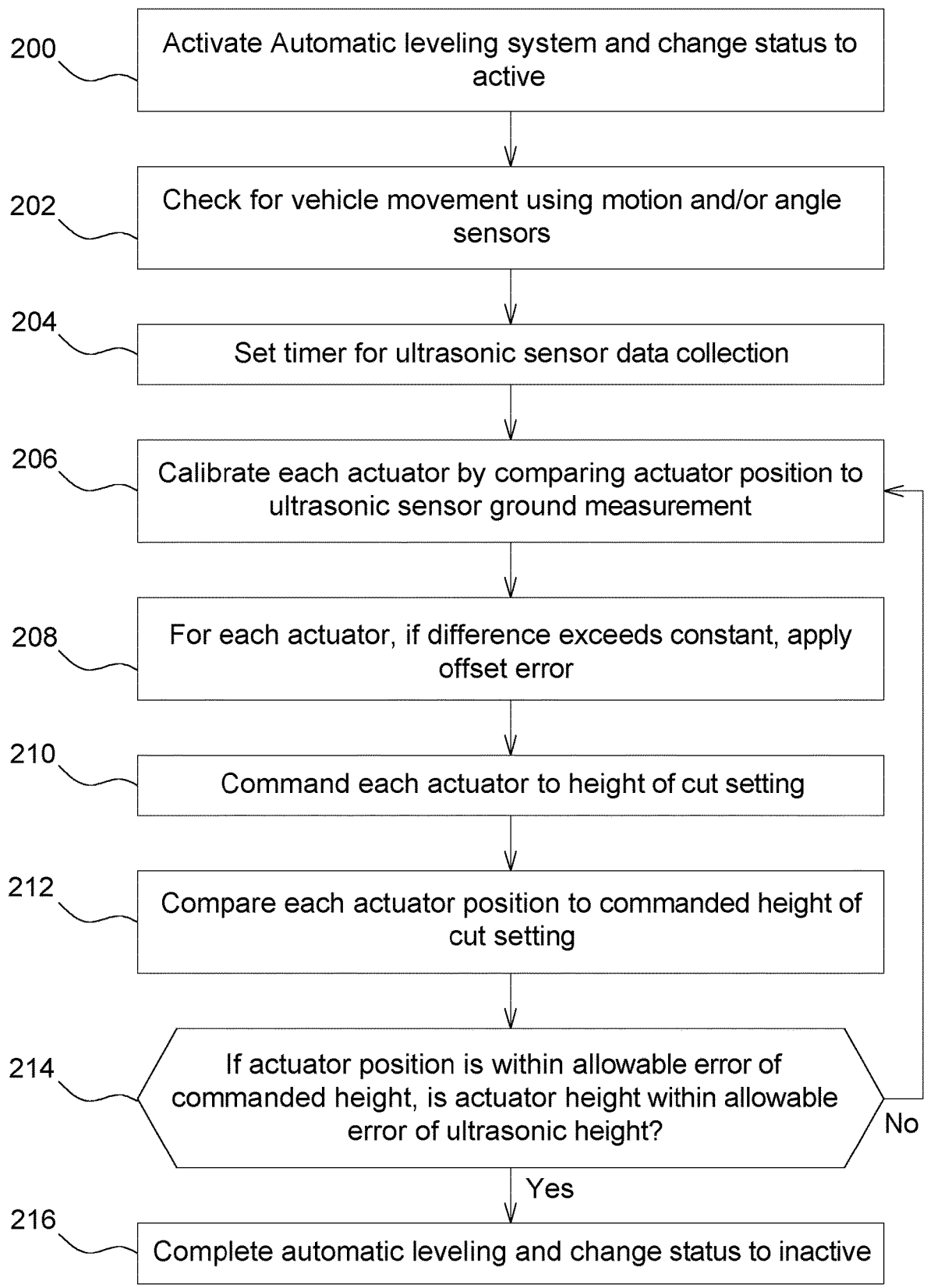
FIG. 3 is a flow diagram of a mower deck automatic leveling system according to a first embodiment of the invention.

In one embodiment, the mower deck automatic leveling system may include electronic controller 118 that may follow the steps shown in the flow diagram of FIG. 3. The method for automatic leveling may start in block 200 when an operator activates the system, for example, by actuating an automatic leveling button on the operator control panel or display, changing the system status from inactive to active. In block 202, the controller for the mower deck automatic levelling system may check for vehicle movement by determining if the signals from the motion and/or angle sensors exceed maximum absolute values required for automatic leveling. In block 204, the controller for the mower deck automatic leveling system may set a timer for collecting and averaging ultrasonic sensor information. Optionally, the timer also may be used to time status changes for the automatic leveling system, and may time the duration for checking angle or motion sensors before calibrating the actuators or leveling the mower deck.

In one embodiment, in block 206, the mower deck automatic leveling system may calibrate each actuator by comparing each actuator's position relative to the mower deck lift system or frame, against an ultrasonic sensor's height measurement to the ground surface. Each actuator may be correctly calibrated when the absolute value of the difference is less than or equal to a stored offset value. For example, the offset value may represent the allowable error between the ultrasonic sensor's height measurement and the actuator's position. In block 208, if the difference for any actuator exceeds the offset value, the system may save the new or updated offset value. Offset values may change due to wear, deformation, warping or bending of the mower deck, lift system or other components. Thus, each actuator may be calibrated using an ultrasonic sensor to measure the position relative to the ground surface, and update an offset value. Calibration of each actuator with an ultrasonic sensor also may be done after the actuators are commanded to the selected height of cut, and may be repeated until all of the actuators are correctly calibrated.

In one embodiment, in block 210, the mower deck automatic leveling system may command each actuator to a position based on the height of cut setting. In block 212, the system may compare each actuator's position to its commanded position at the height of cut setting. In block 214, if the actuator position is within an allowable error of the commanded height, the actuator height may be compared to the ultrasonic height. If the difference is within the allowable error, the deck may be considered level. If the difference for an actuator exceeds the allowable error, the system may return to block 206 and compare each actuator's commanded position at the height of cut setting, against an ultrasonic sensor's height measurement to the ground. For each actuator, the absolute value of the difference should be less than or equal to the stored offset value. Automatic leveling may be completed in block 216 and the system may return to inactive status when each actuator is within an allowable error to the height of cut setting, and within an allowable error to the ultrasonic sensor height measurement to the ground surface.

In a second embodiment, the mower deck automatic leveling system may include an actuator used for leveling the mower deck by adjusting the position of a first side of a mower deck relative to a second side of the mower deck. The actuator may replace a lift link in a lift system for raising and lowering the first side of the mower deck to a height of cut position. The second side of the mower deck also may be connected to a lift system with draft arms and/or lift links that raise and lower the second side of the mower deck to the commanded cutting height, but without an actuator. The second embodiment also may include one sensor on the first side of the mower deck that may calibrate the actuator by measuring the distance to a ground surface, or a sensor on each side of the mower deck. A controller may adjust the actuator based on the measured distance of the single sensor, or until both sensors show the same distance to the ground surface.

Having described the preferred embodiment, it will become apparent that various modifications can be made without departing from the scope of the invention as defined in the accompanying claims.

The invention claimed is:
1. A mower deck automatic leveling system, comprising:
a plurality of sensors mounted to a mower deck at a plurality of locations and providing signals for a distance measurement of each sensor to a ground surface;

a plurality of actuators connected to a mower deck lift system between the mower deck and a vehicle frame; each actuator providing signals for the actuator position relative to the vehicle frame;

at least one of a motion sensor that detects any movement of the mower deck, and an angle sensor that detects a pitch angle and a roll angle of the mower deck; and an electronic controller comparing each of the actuator position signals to one of the sensor signals, and if the difference exceeds a stored offset value, updating the offset value with a new offset value.

2. The mower deck automatic leveling system of claim 1 wherein the electronic controller compares each of the actuator position signals to one of the sensor signals after moving each of the plurality of actuators to a selected height of cut position.

3. The mower deck automatic leveling system of claim 1 wherein the plurality of actuators are electronic linear actuators.

4. The mower deck automatic leveling system of claim 1 further comprising a control panel having a control for starting the mower deck automatic leveling system from an operator seat.

5. The mower deck automatic leveling system of claim 4 wherein the control panel includes a control for selecting the height of cut.

6. A method of automatic leveling a mower deck, comprising the steps of:
measuring a distance to a ground surface at a plurality of different locations on a mower deck when the mower deck is at a selected cutting height;
adjusting the position of the mower deck at each of the plurality of different locations with an actuator between the mower deck and a vehicle frame to the selected cutting height until the mower deck is level; and
calibrating the actuator at each of the plurality of different locations by determining a difference between a distance between the mower deck and the vehicle frame and the measured distance to the ground surface, and comparing the difference to a stored offset value.

7. The method of automatic leveling a mower deck of claim 6 wherein a plurality of ultrasonic sensors are used to measure the distance to the ground surface.

8. A mower deck automatic leveling system, comprising:
a mower deck lift system having an actuator that raises and lowers a first side of a mower deck relative to a second side of the mower deck;
a sensor that measures a distance of the first side of the mower deck to a ground surface;
a controller that adjusts the actuator to level the mower deck based on the measured distance of the sensor; and
an inertial measurement unit on the mower deck that measures a roll angle and a pitch angle of the mower deck, and wherein the controller does not adjust the actuator to level the mower deck unless the roll angle and the pitch angle are below specified angles.

9. The mower deck automatic leveling system of claim 8 wherein the sensor is an ultrasonic sensor.

10. The mower deck automatic leveling system of claim 8 wherein the actuator is an electric linear actuator.

11. The mower deck automatic leveling system of claim 8 wherein the controller calculates an offset error for the actuator if a difference between an actuator position and the measured distance of the sensor exceeds a stored constant.

\* \* \* \* \*